(12) United States Patent
Leenhouts

(10) Patent No.: US 6,362,815 B1
(45) Date of Patent: Mar. 26, 2002

(54) TOUCH SENSOR DISPLAY

(75) Inventor: Frans Leenhouts, Eindhoven (NL)

(73) Assignee: Flat Panel Display Co. B.V., Eindhoven (NL)

( * ) Notice: Subject to any disclaimer, the term of this patent is extended or adjusted under 35 U.S.C. 154(b) by 0 days.

(21) Appl. No.: 09/288,404

(22) Filed: Apr. 8, 1999

(30) Foreign Application Priority Data

Apr. 9, 1998 (EP) .............................. 98201134

(51) Int. Cl.[7] .................................. G09G 5/00
(52) U.S. Cl. .................. 345/173; 345/102; 345/104
(58) Field of Search ................ 345/173, 102, 345/104; 178/18.01, 18.1

(56) References Cited

U.S. PATENT DOCUMENTS 3,909,823 A * 9/1975 Knowlton ................... 345/104
5,194,862 A    3/1993 Edwards ..................... 341/20
5,278,545 A    1/1994 Streck ........................ 345/102
5,428,468 A *  6/1995 Zimmerman et al. ........ 349/62
5,461,547 A * 10/1995 Ciupke et al. ............... 362/31
5,596,343 A *  1/1997 Snider ........................ 345/102
5,966,112 A * 10/1999 Katagiri et al. ............. 345/104

FOREIGN PATENT DOCUMENTS

EP           495199       1/1991    ........... G06F/3/033

* cited by examiner

Primary Examiner—Kent Chang
(74) Attorney, Agent, or Firm—Aaron Waxler

(57) ABSTRACT

In a touch panel display, a substrate (11) of the touch panel (10) or the touch panel itself is used as an optical guide for lighting a reflective display (20).

8 Claims, 1 Drawing Sheet

TOUCH SENSOR DISPLAY

BACKGROUND OF THE INVENTION

The invention relates to a device comprising a sensor device with a detection device for determining information of at least a part of a surface of the sensor device, a display device comprising an electro-optical medium between two substrates, and a driver for driving the display device in dependence upon the information obtained via the detection device.

Devices of this type (also referred to as touch-panel displays) are generally known, in which different sensor mechanisms can be used. For determining information, it is possible to activate a part of the surface by scanning and measuring, for example activating via light (by means of, for example, a light pen) and by subsequently measuring induced currents or capacitively or resistively measuring electric voltages induced by pressure variation. The displayed information may vary from the co-ordinates of the part of the surface to the luminescence of the relevant part or possibly a menu activated thereby in computer applications.

A device of this type is described in U.S. Pat. No. 5,194,862. For the sensor device described in this patent it is indicated how it can be used as an overlay for a liquid crystal display device (LCD).

When this type of device is used, notably in portable applications (mini-notebook computers, personal digital assistance devices, telecommunication), it is desirable that a minimal quantity of energy is used. A considerable part of the energy is used in the illumination source which is situated behind the display device.

SUMMARY OF THE INVENTION

The device comprises, between the sensor device and the electro-optical medium, an optical guide of optically transparent material having a plurality of end faces, at least one of which is an entrance face for light, while light can be coupled in at said end face, and the side of the optical guide facing the electro-optical medium constitutes an exit face for the light. The substrate of the sensor device preferably comprises the optical guide.

Since the device and particularly the sensor device comprises the optical guide, the latter is. integrated therein and an illumination source (backlight) situated behind the electro-optical medium may be omitted. The entire device will thereby become more compact (flatter).

For a satisfactory coupling of the light from the optical guide to the electro-optical medium, the surface of the optical guide is preferably roughened or provided with a sawtooth structure or a substantially hemispheric structure on the side of the electro-optical medium.

The display device is preferably reflective. Such display devices make use of ambient light and are based on the use of a reflector or reflective electrodes. Since notably reflective LCDs are not sufficiently bright without the measure according to the invention in situations where there is little ambient light, transflective display devices (LCDs) are also used. In these devices, an illumination source (backlight) is situated behind the LCD while a transflector (transflective electrodes) is chosen instead of the reflector (the reflective electrodes). However, since the reflective power decreases, the optical quality of the image in the reflective mode is considerably reduced. Moreover, also in this case, it is necessary to arrange a backlight behind the electro-optical medium.

Another solution is the use of an extra light source at the front side (front light system). Here again, the total volume increases to such an extent that this is inadmissible, notably for said applications.

A preferred embodiment of a device according to the invention is characterized in that the substrate also comprises a substrate of the display device. The assembly will thereby become even more compact.

In a further embodiment, the substrate of the display device remote from the optical guide comprises a silicon substrate incorporating, for example, drive switches (active drive) or further drive functions.

These and other aspects of the invention are apparent from and will be elucidated with reference to the embodiments described hereinafter.

BRIEF DESCRIPTION OF THE DRAWINGS

The Figures are diagrammatic and not drawn to scale. Corresponding components are generally denoted by the same reference numerals.

DETAILED DESCRIPTION OF THE PREFERRED EMBODIMENTS

Figure 1:
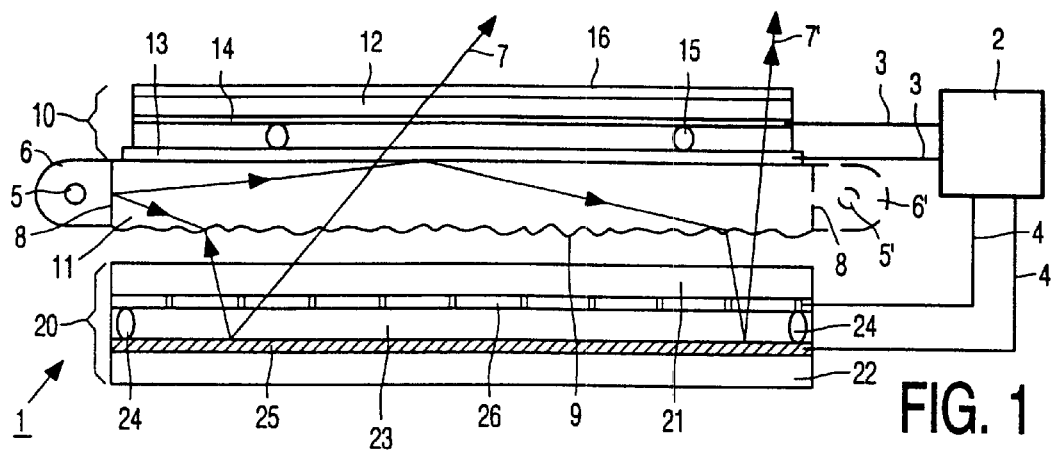
FIG. 1 is a cross-section of a device according to the invention.
Figure 2:
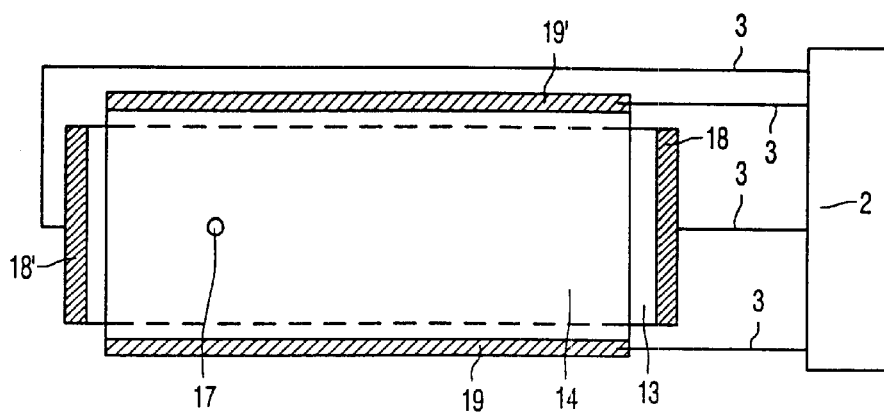
FIG. 2 is a plan view of the sensor device.

FIG. 1 shows a device 1 (touch panel display) according to the invention with a sensor device 10, in this example a pressure-sensitive device having a first transparent substrate 11 and a second transparent substrate 12. Transparent conducting layers, for example ITO layers 13, 14 which are contacted via metallization strips 18, 19 (FIG. 2), are provided on the substrates 11, 12. In this example, the assembly is provided with a protective coating 16, while the substrates are spaced apart by means of spacers 15. If the surface of the sensor device 10 is touched with a pen, for example, at the position 17, while the connection metallizations 19, 19' are, for example, connected to earth via connection lines 3, the resistance between the connection metallizations 18, 18' changes. This change of resistance, which is measured also via connection lines 3, is an indication of, for example the X co-ordinate of position 17 which is stored in detection device 2. Similarly, the Y co-ordinate is determined and stored. If necessary, these X and Y co-ordinates are processed and determine drive signals which are applied to the display device 20 via connection lines 4. In this embodiment, the display device 20 is a reflective liquid crystal display device (LCD) comprising twisted nematic liquid crystal material 23 which is present between two substrates 21, 22 of, for example glass, provided with reflecting electrodes 25 of, for example aluminum, and light-transmissive ITO electrodes 26. The assembly is sealed by means of a sealing edge 24. If necessary, the display device further comprises one or more polarizers and orientation layers (not shown) which orient the liquid crystal material on the inner walls of the substrates.

Information about the position 17 (the position where the sensor device is activated) is processed in the detection device (which also functions as a processing unit) to an image to be displayed (a luminescing pixel, a functional icon or a computer menu). Instead of the mechanism described above, the detection device may also be based on a matrix of light-sensitive elements which are activated by means of a light pen as used in, for example the device described in said U.S. Pat. No. 5,194,862.

According to the invention, the substrate 11 of the sensor device also functions as a front light for the LCD 20 for the case where the visibility of the displayed image is insufficient due to insufficient ambient light. To this end, the substrate 11 is implemented as an optical guide of an optically transparent material having a number of end faces 8, while the side 9 of the optical guide facing the electro-optical medium 23 (hence the display device 20) constitutes an exit face for the light. To this end, a lamp 5 from which light can be coupled in at said end face is accommodated in a lamp housing 6 opposite at least one end face 8. If necessary, lamps, diagrammatically indicated by means of the reference numerals 5', 6', may be arranged at more end faces.

In order to enhance the coupling of the light rays 7, 7' from the lamp 5, the surface 9 of the substrate 11 facing the LCD 20 is roughened or is provided with the sawtooth structure or a substantially hemispheric structure.

Figure 3:
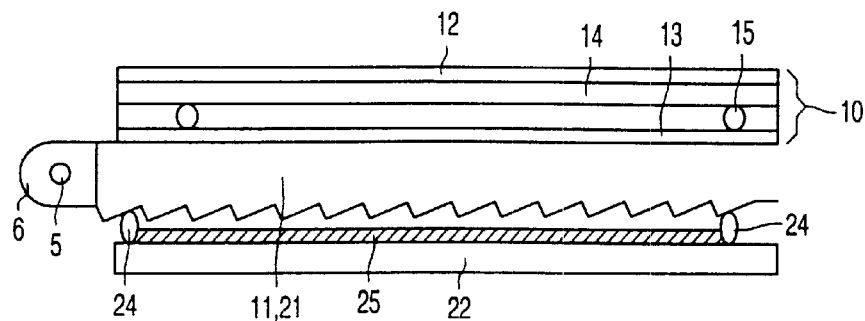
FIGS. 3 and 4 are variants of FIG. 1.

A substrate 11 having a sawtooth structure is shown in FIG. 3 in which the substrate 11 also functions as substrate 21 of the display device. Such a sawtooth structure (in one direction or two mutually perpendicular directions) is provided on, for example a flat glass substrate by means of replica techniques. The device of FIG. 3 has become even more compact than that of FIG. 1. The reference numerals in FIG. 3 have the same significance as those in FIG. 2.

PDLC material has been chosen for the layer 23 of electro-optical material; in this case, polarizers are superfluous.

Figure 4:
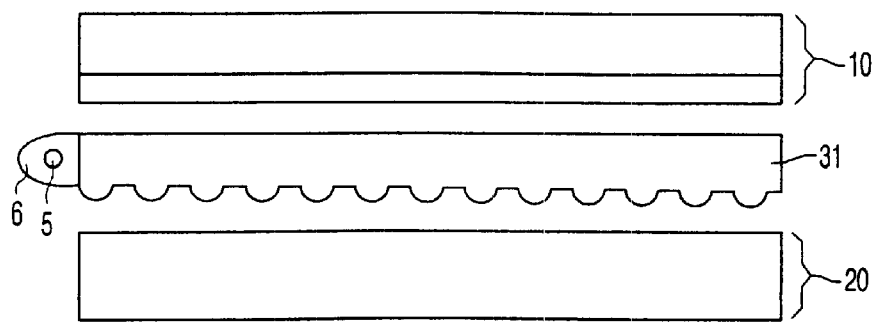

FIG. 4 is a cross-section of a part of a device according to the invention in which the exit face of the optical guide 31 between the sensor device 10 and the display device 20 has a hemispheric structure (spherical or cylindrical surface). In practice, the projections are slightly flattened or deviate in another sense from the ideal hemispheric or cylindrical structure.

Other modes of coupling out the light to the display device are alternatively feasible, such as benefiting in the correct manner from the side of the substrate 11 facing the sensor device, or by providing this substrate with cavities or light-scattering centers.

In another embodiment, the coupling-out is realized by the spacers 15 or by adapting (hemispheric structure) the other surface of the substrate 11 or the substrate 12 or the coating 16. In that case, the total sensor device functions as an optical guide.

Although reflecting electrodes 25 have been shown, they may be alternatively transmissive when a reflector is situated on the other side of the substrate 22. Instead of an LCD display device, other reflective display devices may be used alternatively.

A silicon substrate 22 in which, for example drive electronics is realized by means of IC technology, may also be used.

What is claimed is:

1. A device comprising a sensor device with a detection device for determining information of at least a part of a surface of the sensor device, a display device comprising an electro-optical medium between two substrates, and a driver for driving the display device in dependence upon the information obtained via the detection device, characterized in that the sensor device comprises an optical guide of optically transparent material having a plurality of end faces, at least one of which is an entrance face for light, while light can be coupled in at said end face, and the side of the optical guide facing the electro-optical medium constitutes an exit face for the light.

2. A device comprising a sensor device with a detection device for determining information of at least a part of a surface of the sensor device, a display device comprising an electro-optical medium between two substrates, and a driver for driving the display device in dependence upon the information obtained via the detection device, characterized in that the device comprises, between the sensor device and the electro-optical medium, an optical guide of optically transparent material having a plurality of end faces, at least one of which is an entrance face for light, while light can be coupled in at said end face, and the side of the optical guide facing the electro-optical medium constitutes an exit face for the light.

3. A device as claimed in claim 2, characterized in that a substrate of the sensor device comprises the optical guide.

4. A device as claimed in claim 2, characterized in that the surface of the optical guide is roughened on the side of the electro-optical medium.

5. A device as claimed in claim 2, characterized in that the surface of the optical guide is provided with a sawtooth structure or a substantially hemispheric structure on the side of the electro-optical medium.

6. A device as claimed in claim 2, characterized in that the device is provided with a light source opposite the end face.

7. A device as claimed in claim 2, characterized in that the substrate also comprises a substrate of the display device.

8. A device as claimed in claim 2, characterized in that the substrate of the display device remote from the optical guide comprises a silicon substrate.

* * * * *